(12) United States Patent
Adkins

(10) Patent No.: US 12,516,753 B2
(45) Date of Patent: Jan. 6, 2026

(54) MODULAR CONDUIT SUPPORT ASSEMBLY

(71) Applicant: Brian Adkins, Fountain Inn, SC (US)

(72) Inventor: Brian Adkins, Fountain Inn, SC (US)

(73) Assignee: Brian Adkins, Fountain Inn, SC (US)

( * ) Notice: Subject to any disclaimer, the term of this patent is extended or adjusted under 35 U.S.C. 154(b) by 0 days.

(21) Appl. No.: 18/616,677

(22) Filed: Mar. 26, 2024

(65) Prior Publication Data

US 2025/0305597 A1    Oct. 2, 2025

(51) Int. Cl.
*F16L 3/00* (2006.01)
*F16L 3/22* (2006.01)

(52) U.S. Cl.
CPC ...................... *F16L 3/22* (2013.01)

(58) Field of Classification Search
None
See application file for complete search history.

(56) References Cited

U.S. PATENT DOCUMENTS

| | | |
|---|---|---|
| 772,044 A | 10/1904 | Lindner |
| 794,434 A | 7/1905 | Valiquet |
| 795,046 A | 7/1905 | Lorenz |
| 795,047 A | 7/1905 | Lynn |
| 795,048 A | 7/1905 | Maguire |
| 1,801,451 A | 4/1931 | Parker |
| 1,822,475 A | 9/1931 | Burke |
| 2,425,935 A | 8/1947 | Layman |
| 3,397,431 A | 8/1968 | Walker |
| 4,099,626 A | 7/1978 | Magnussen, Jr. |
| 4,202,520 A | 5/1980 | Loos et al. |
| 4,210,202 A | 7/1980 | Boyer et al. |
| 5,992,802 A | 11/1999 | Campbell |
| 6,706,969 B1 | 3/2004 | Young |
| 6,857,606 B1 | 2/2005 | Gretz |
| 7,284,598 B2 * | 10/2007 | Mulder ................. F28F 9/0131 165/172 |
| 7,942,371 B1 | 5/2011 | McCoy |
| 8,783,631 B2 | 7/2014 | McCoy |
| 9,217,519 B2 | 12/2015 | Masters et al. |
| D794,433 S | 8/2017 | McCoy |
| 10,199,620 B2 * | 2/2019 | Romand ................. H01M 6/44 |
| 10,717,589 B2 * | 7/2020 | Lu ........................... B65D 85/20 |
| 10,944,355 B2 * | 3/2021 | Jette ...................... F16L 3/2235 |
| 11,469,583 B2 | 10/2022 | McCoy |
| 12,034,289 B1 * | 7/2024 | Garner ................. H02G 3/0456 |
| 12,152,710 B2 * | 11/2024 | Khan ........................ G02B 6/06 |

(Continued)

*Primary Examiner* — Steven M Marsh

(74) *Attorney, Agent, or Firm* — Fox Rothschild LLP

(57) ABSTRACT

A modular conduit support assembly is formed from a single sheet of generally rigid material and includes a main body member defining a series of holes for receiving conduit, a pair of feet that are attachable to the bottom edge of the main body member, and a pair of stakes for securing the feet to the ground. The main body member, feet and stakes are formed from a single sheet of material, and the holes, feet and stakes are partially cut into the sheet of material so that the conduit support assembly may be shipped to a job site in a generally flat, planar configuration. The interior of the holes, the feet and stakes may then be easily detached from the main body member at the construction job site for assembly and use. This arrangement allows efficient shipment of multiple conduit support assemblies in a stacked configuration.

14 Claims, 7 Drawing Sheets

(56) References Cited

U.S. PATENT DOCUMENTS

2005/0109884 A1    5/2005   Wylie
2011/0204202 A1    8/2011   Masters et al.
2017/0184223 A1*   6/2017   Dean .................... F16L 3/1211

* cited by examiner

MODULAR CONDUIT SUPPORT ASSEMBLY

BACKGROUND OF THE INVENTION

Various types of construction projects require a series of conduits to be buried underground. Such conduit may include plumbing, sewage pipes, conduit for carrying electrical wire, fiber optic cable, coaxial or other types of communication or data cable, and the like. In such cases, construction crews and/or subcontractors dig a trench, and place multiple conduits into the trench, and then the trench is filled with concrete. In such cases, multiple conduits are positioned within the trench in a generally parallel configuration, and it has been found advantageous to temporarily secure these conduits within the trench until the concrete can be poured, so that the conduits can be completely encased therein.

Heretofore, efforts have been made to develop a wide variety of systems and structures for this purpose. The following documents describe several examples of these structures that have been designed and used to hold multiple conduits in place, either permanently or temporarily, and these documents are hereby incorporated herein by reference, in their entireties:

U.S. Pat. No. 4,099,626 Modular Rack

A modular component of a rack for storing articles comprises: a. a longitudinally elongated body having opposite sides, a longitudinally elongated boundary, longitudinally spaced segmented boundaries laterally spaced from said longitudinally elongated boundary, and longitudinally spaced laterally extending boundaries at longitudinally opposite ends of the body, b. the body having tongue and groove connections at certain of said boundaries, said connections defining guide shoulders extending widthwise between said opposite sides for guided connection with like tongue and groove connections on a like modular component, c. and said body defining through openings extending widthwise between said sides, said openings sized to receive said articles which are elongated in said width wise direction, said through openings being longitudinally spaced between said laterally extending boundaries, and said openings located generally between said segmented boundaries.

U.S. Pat. No. 4,202,520 Modular Support Assembly for Tubes

A support assembly is disclosed which is especially useful for supporting a plurality of tubular members such as the steel or fiberglass pressure tube assemblies used in a reverse osmosis water purification system. A molded, cast, extruded or pultruded hollow module element is formed with flat sides and a concave cylindrical tube receiving surface so that a plurality of modules can be stacked vertically and/or horizontally to support any desired number of tubes. Apertures in the flat sides permit the modular elements to be quickly attached and aligned to each other by nut and bolt or other type fastener elements. Various modifications of the shape and size of the modules permit the support by a single module of one-fourth of one tube, one-half of one tube, or one-half of each of two tubes.

U.S. Pat. No. 4,210,202 Support for Heat Exchange Tubes

Rows of heat exchange tubes are supported by transversely disposed support strips having a plurality of V-shaped members interconnected end to end in a manner so that said strips act as a structural member supporting the weight of the tubes and additional support elements from all rows above a given row. Each leg of each V-shaped member has a generally triangular tab bendable out of the plane of its associated leg.

U.S. Pat. No. 5,992,802 Cable Support

A support for parallel runs of coaxial cable is made up of pairs of molded blocks stacked on a single threaded rod. The blocks of each pair are identical, and have semi-circular cylindrical recesses which cooperate to provide circular, cable-gripping passages. The threaded rod extends in orthogonal relationship to the axes of the cable-gripping passages, through another passage located between two of the circular, cable-gripping passages, and cables can be installed and removed by loosening a nut on the rod, separating the blocks of a cooperating pair, and sliding the cables into and out of the recesses, without detaching any of the blocks from the rod. The blocks have interengaging ribs which prevent any pair of blocks from rotating about the rod relative to another pair of blocks.

U.S. Pat. No. 6,706,969 Cable Supporting and Spacing Device

A cable support apparatus includes a plurality of cable spacing members. Each member has a plurality of spaced-apart cable receiving openings for receiving a plurality of cables in spaced-apart relationship. There is a bracket having a plurality of cable spacing member openings, each of the cable spacing member openings being shaped to releasably receive one of the cable spacing members, whereby each of the cable spacing members can be removed from or replaced on the bracket without removing any other said cable spacing member.

U.S. Pat. No. 6,857,606 Cable Support and Method

A cable support and method for securing a plurality of cables to the structure of a building in such a manner that they are maintained parallel and separate from one another. The one-piece cable support includes a base with an attachment arrangement for anchoring to a surface and a plurality of first and second holding members. Each first holding member includes an arcuate cable holder, a slot, and a deformable member thereon. Each second holding member includes a cable rest thereon. The first and second holding members are paired in sets. The base is secured to a building structure and a cable laid within each set of holding members. A leverage tool is inserted within each slot and leverage applied to deform the deformable member until it contacts the inserted cable. The sets of holding members are aligned parallel to one another thereby providing a cable installation in which each of the inserted cables are securely held separate and parallel to one another.

U.S. Pat. No. 7,942,371 Conduit Spacer for Duct Banks

Conduit spacers useful in preparing duct banks are disclosed. The conduit spacers are designed for attachment to each other in vertical and horizontal combinations, that is, they may be arranged in side-by-side arrays, up-and-down arrays, or arrays that are both side-to-side and up-and-down. Thus, the conduit spacers include both vertical and horizontal restraints or interlocks. The vertical interlocks are achieved by the use of tapered tabs and tapered slots, both the tabs and the slots having tapers in the same horizontal direction. Horizontal interlocks are made by the use of rails and matching grooves in the sides of the spacers. Thus, both vertical and horizontal interlocks are achieved by assembling the ducts in a horizontal direction, side-by-side as desired for width, and up-and-down as desired for height. The number and length of conduits and the length of the duct banks needed dictate how many spacers are needed.

U.S. Pat. No. 8,783,631 Low EMF Compact Duct Spacer

Conduit spacers useful in preparing duct banks with reduced electromagnetic fields (EMF) are disclosed. The conduit spacers are designed to maximize phase cancellation of EMF from a closely-spaced series of electric power cables placed in conduits supported underground by the conduit spacers. The spacers are also designed to minimize the EMF above ground by reducing the distance needed to bury the cables for a given EMF above ground. In one embodiment, the spacers place conduits adjacent one another for maximum cancellation of a single three-phase cable installation. In another embodiment, the spacers place conduits adjacent one another for maximum cancellation for a dual three-phase cable installation, including cross-phase cancellation, e.g., A-B-C and C-B-A.

U.S. Pat. No. 9,217,519 Systems and Methods for Supporting Tubular Members

Apparatus, systems, and methods for supporting tubular members are provided. A support structure can include at least one body having a plurality of openings disposed therethrough. Each opening can have an inner surface that includes at least one circular portion and at least one elliptical portion.

U.S. Pat. No. 11,469,583 Bore Spacers for Underground Installations

Apparatuses and methods are disclosed for assembling ducts or conduits with multi-part spacers for underground installation. Sequential loading of conduits to multi-part spacers, as opposed to older methods of end loading, allows construction workers to easily assemble conduits to a plurality of multi-part duct spacers above-ground. The multi-part loading technique allows sequential loading of conduits into portions of spacers, the spacers having bores to accommodate the conduits. The parts or components of the multi-part spacers may themselves cooperate to mount conduits into a conduit bank or bundle. Thus, conduits are assembled or mounted to a first portion of the spacer, followed by mounting a second portion of the spacer and then additional conduits, which may be mounted to either or both of the first and second portions. Once assembled, the banks or bundles may then be secured with banding and wheeled into a protective casing.

U.S. Application No. 20050109884 Device and Method for Grouping, Organizing and Separating Multiple Cables and Other Control Lines A device for holding a plurality of associated cables in a defined orientation relative to each other is disclosed. The device includes a support structure that defines a plurality of cable retaining locations each adapted to receive and releasably retain an associated cable. The cable retaining locations are arranged in a pattern that corresponds to a pattern of connectors of an associated interface device to which the cables are adapted to be connected so as to provide a one-to-one correspondence between each cable retaining location and each connector of the associated interface device. The support structure is transparent and/or provides a plurality of open viewing windows. The device can be tethered to the associated interface device or a mounting structure.

U.S. Application No. 20110204202 Systems and Methods for Supporting Tubular Members Apparatus, systems, and methods for supporting tubular members are provided. A support structure can include at least one body having a plurality of openings disposed therethrough. Each opening can have an inner surface that includes at least one circular portion and at least one elliptical portion.

All of the foregoing systems and structures suffer from disadvantages and drawbacks. For example, the structures and systems previously developed can be expensive to manufacture, unwieldy to handle during construction, and may be bulky and heavy, which increases costs for shipping and handling. Therefore, it would be advantageous to provide a structure for maintaining conduit in parallel configuration in an underground trench, wherein the structure may be formed from a light-weight flat sheet of material that has been pre-cut into a desired shape, and to include holes for receiving the conduit, and further including sections that are partially cut to include feet and stakes. In some embodiments, the holes, feet and stakes are partially cut so that each structure may be shipped as a single, flat unit, and the partially cut portions for the holes, feet and stakes may be easily removed from the sheet by construction personnel at the construction site. Essentially, these partial cuts are scores, so that the interior portions of the holes, the feet and stakes may simply pop off of the sheet of material in the same manner as parts of a model airplane are removed from the skeletal polymeric structure that connects them. Once the partially cut portions of holes, feet and stakes are removed from the sheet of material, the modular conduit assembly may be assembled and temporarily secured within a trench in order to support multiple conduits before and during the concrete pouring operation.

SUMMARY OF THE INVENTION

The present invention, in one embodiment, includes a modular conduit support assembly that includes a main body member defining a series of holes for receiving conduit therethrough. The holes may be of any desired size and shape, and may be designed to include holes of various sizes and shapes that correlate with the particular conduit that will be used therewith. The main body member may also include a pair of vertically oriented slots along a bottom edge thereof for receiving feet, which are used to maintain the main body member in a vertically oriented, upright position. Each foot may also include a vertically oriented slot disposed along a top edge thereof, which engages one of the slots along the bottom edge of the main body member. In a preferred embodiment, each foot also defines at least one hole for receiving a stake therethrough. In use, support assembly is assembled by attaching the feet to the main body member, and stakes are driven through holes in the feet and extend into the side of the trench in which the apparatus sits, in order to provide additional temporary support for conduit or tubes that extend through one or more holes in the main body member.

The modular conduit support assembly is preferably manufactured from a flat sheet of material, wherein the sheet of material is cut (in any suitable fashion) to form a main body member defining a series of holes for receiving conduit. Additionally, partial cuts are made in the flat sheet of material to form holes, stakes and feet. These partial cuts allow the interior portions of the holes, the feet and stakes to remain attached to the main body member throughout shipping and transport to a job site. Upon arrival, when it is time for the modular conduit support assembly to be employed, the stakes and feet may simply and easily be removed from the main body member for assembly. In an alternate embodiment, the uncut sheets may be delivered to a job site, where the cutting process may be performed on-site, on an as-needed basis.

DESCRIPTION OF THE DRAWINGS

These and other features, aspects, and advantages of the present invention will become better understood with regard to the following description and accompanying drawings where.

DETAILED DESCRIPTION OF THE INVENTION

Figure 1:
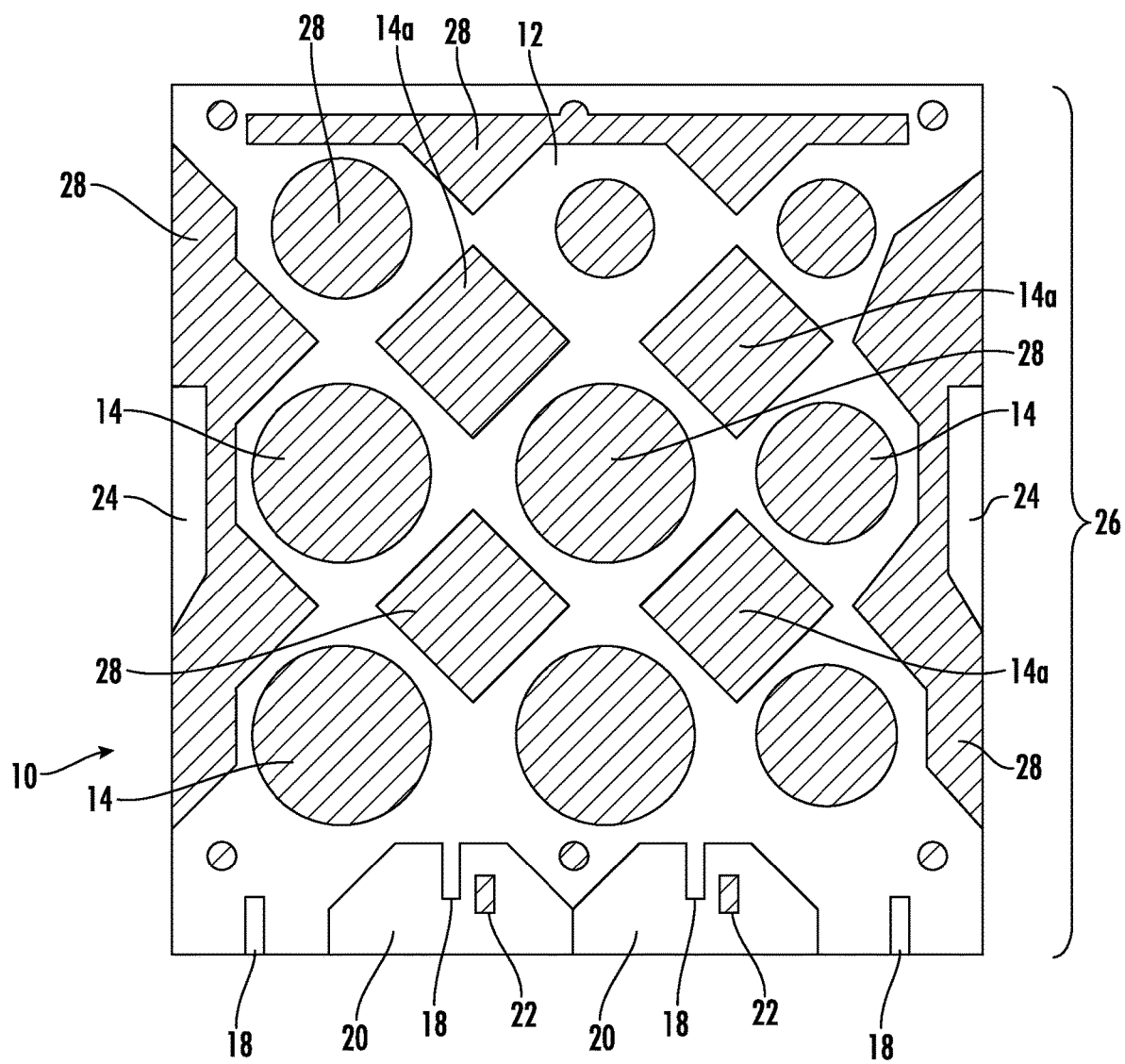
FIG. 1 is a front view of one embodiment of a modular conduit support assembly that has been partially cut from a single flat, planar sheet of material with partial cuts, or scores, so that the individual components may be removed from one another, and wherein excess material may be detached and discarded or recycled, wherein the individual components include a main body member defining a series of holes for receiving conduit and for concrete flow-through and vertically oriented slots positioned along a bottom edge thereof, a pair of stakes, and a pair of feet, wherein each foot includes a vertically oriented slot on a top edge thereof and a hole or slot for receiving one of the stakes.
Figure 2A:
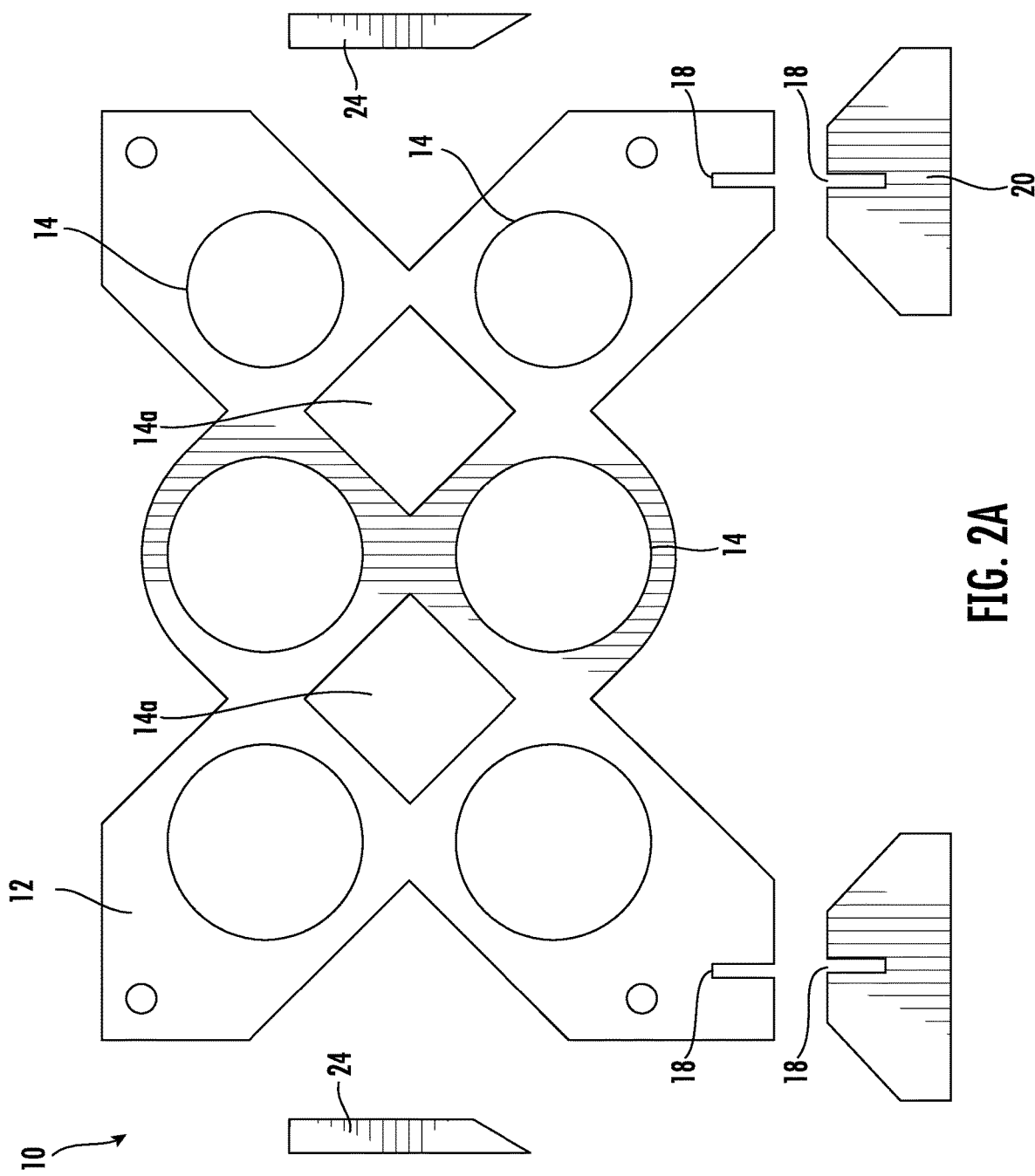
FIG. 2A is a front view of one embodiment of a modular conduit support assembly, wherein the individual components have been separated from one another and from the waste material, wherein the individual components include a main body member defining a series of holes for receiving conduit and for concrete flow-through and a pair of vertically oriented slots positioned along a bottom edge thereof, a pair of stakes, and a pair of feet, wherein each foot includes a vertically oriented slot on a top edge thereof and a hole or slot for receiving one of the stakes.
Figure 2B:
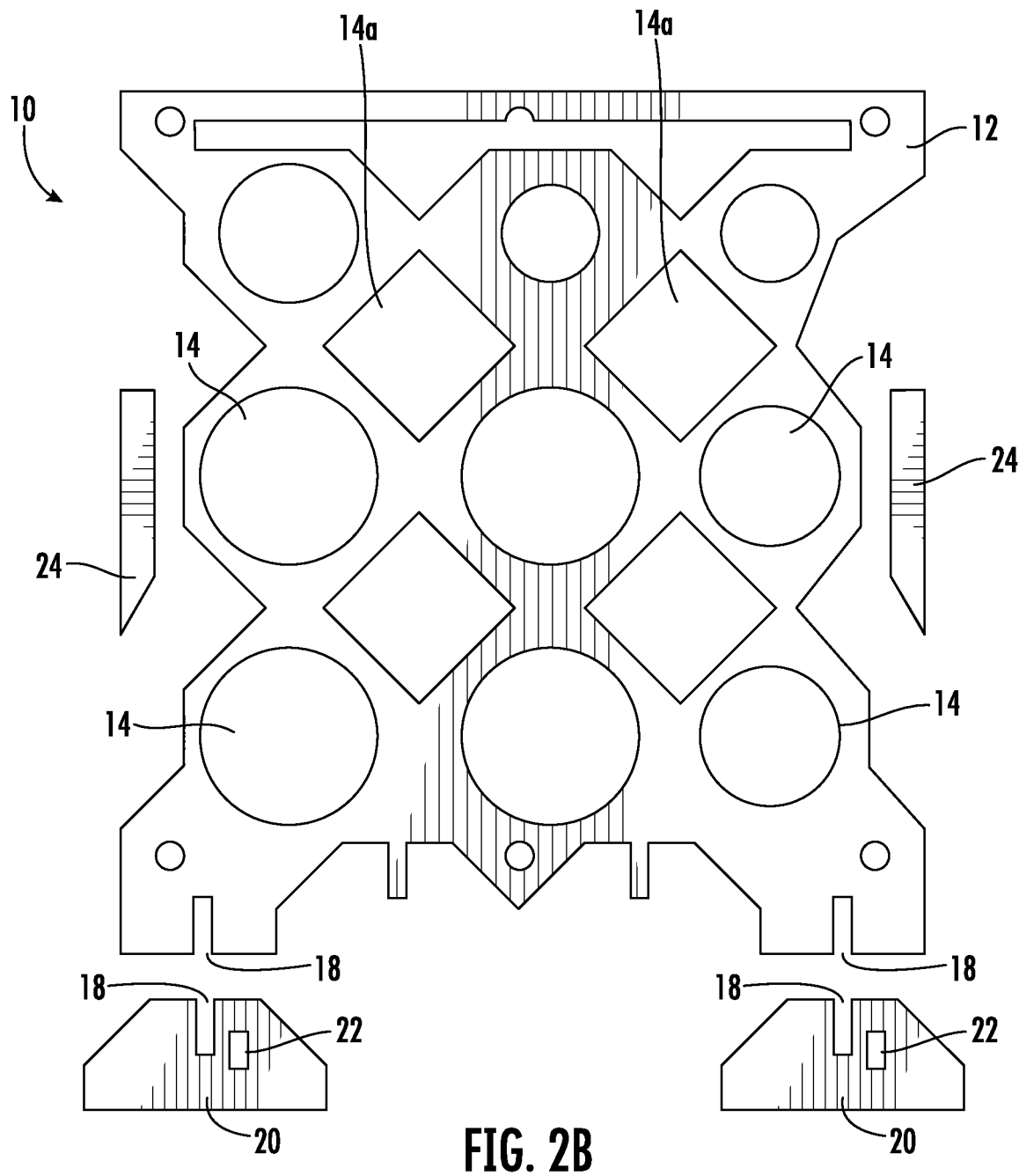
FIG. 2B is a front view of the embodiment of a modular conduit support assembly shown in FIG. 1, wherein the individual components have been separated from one another and from the waste material, wherein the individual components include a main body member defining a series of holes for receiving conduit and for concrete flow-through and a pair of vertically oriented slots positioned along a bottom edge thereof, a pair of stakes, and a pair of feet, wherein each foot includes a vertically oriented slot on a top edge thereof and a hole or slot for receiving one of the stakes.

As shown in FIGS. 1-5, the present invention includes, in one embodiment, a modular conduit support assembly 10 includes a generally flat, planar main body member 12 defining a series of holes 12 for receiving conduit 16, or the like. A pair of vertically oriented slots 18 are disposed along a bottom edge on either side of the main body member 12. A pair of feet 20 are included, and each foot 20 defines a vertically oriented slot 18 along a top edge thereof. Each foot 20 is attachable to the main body member 12 so that the slot 18 of the foot 20 engages with one of the slots 18 at the bottom edge of the main body member 12, as shown in FIGS. 3A and 3B. In a preferred embodiment, each foot 20 also defines a hole or slot 22 within an interior portion thereof for receiving a stake 24.

The main body member 12, the feet 20 and the stakes 24 are preferably formed from a single, flat sheet of material 26, such as polyvinyl chloride, high-density polyethylene, or any other suitable material. To manufacture the modular conduit support assembly 10, a sheet of material 26 is cut, or partially cut, to create the shape of the main body member 12, including the holes 14 disposed within the interior thereof. The holes 14 may be of any desired size and shape, and may be of the same size and shape throughout the main body member 12, or may be of different sizes and shapes to accommodate conduit 16 having different diameters and cross-sectional shapes. Additional holes 14a may be cut to allow concrete to flow therethrough during the concrete pouring operation.

In one particularly advantageous embodiment, an automated router is used to cut or partially cut the holes 14, 14a, the stakes 24 and the feet 20. The automated router may be programmed to cut the main body member 12 into any desired shape, place the holes 14, 14a in any desired location, and to specify the depth of the cut within the sheet of material 26. The automated router may make the cuts completely through the sheet of material 26, or it may be programmed to make partial cuts to any desired depth within the sheet of material 26, allowing for easy snap detachment of the various components from each other and from excess material 28. Each cut may be customized, so that either all of the cuts are partial cuts, some cuts are partial and some are complete cuts, or all of the cuts are complete cuts. Additionally, the automated router may be programmed to form the main body member 12, holes 14, 14a, feet 20 and stakes 24 into any desired size or shape.

In a preferred embodiment of the manufacturing process, the holes 14, 14a, stakes 24 and feet 20 are partially cut from the same sheet of material 26 as the main body member 12, so that the interior of the holes 14, 14a, the feet 20, stakes 24 and excess material 28 remain attached to the main body member 12 in detachable fashion. In other embodiments, the holes 14, 14a and/or other components may be completely cut into the main body member 12, for instance, and the excess material 28 removed from the holes 14, 14a. The sheets of material 26 may be of any desired size, shape and thickness, but a preferred thickness range is between ¼ inch to ⅝ inch. To perform the partial cuts, it is preferred to leave a material thickness of about 0.002 inches after the partial cuts have been made, and a preferred range for the material thickness remaining after the partial cuts is between about 0.001 and 0.005 inches, although partial cuts may leave more or less material remaining, as desired, and those thicknesses may be adjusted within that range or outside of that range based on the particular type of material used to form the modular conduit support assembly 10. The object of the partial cuts is to leave enough material so that the partially cut sheet may maintain its structural integrity during the shipping and transport stage, while allowing the components and excess material 28 to be separated from one another easily and cleanly, and preferably without the use of tools.

In the partially cut form, as shown in FIG. 1, multiple modular conduit support assemblies 10 may be stacked and shipped to a job site, where the interior of the holes 14, 14*a*, the feet 20 and stakes 24 (or any combination thereof) may be easily removed and snapped off of the main body member 12 by construction personnel. In this way, multiple modular conduit support assemblies 10 may be packaged and shipped, where each unit is shipped in a single, flat, unitary unit, which decreases the cost of shipping and handling for each modular assembly. On site, construction crews may simply elect to remove only the hole interior pieces for the specific holes needed for that specific job, while leaving the excess material 28 in the interior of the remaining holes in place and attached to the main body member 12.

Figure 3A:
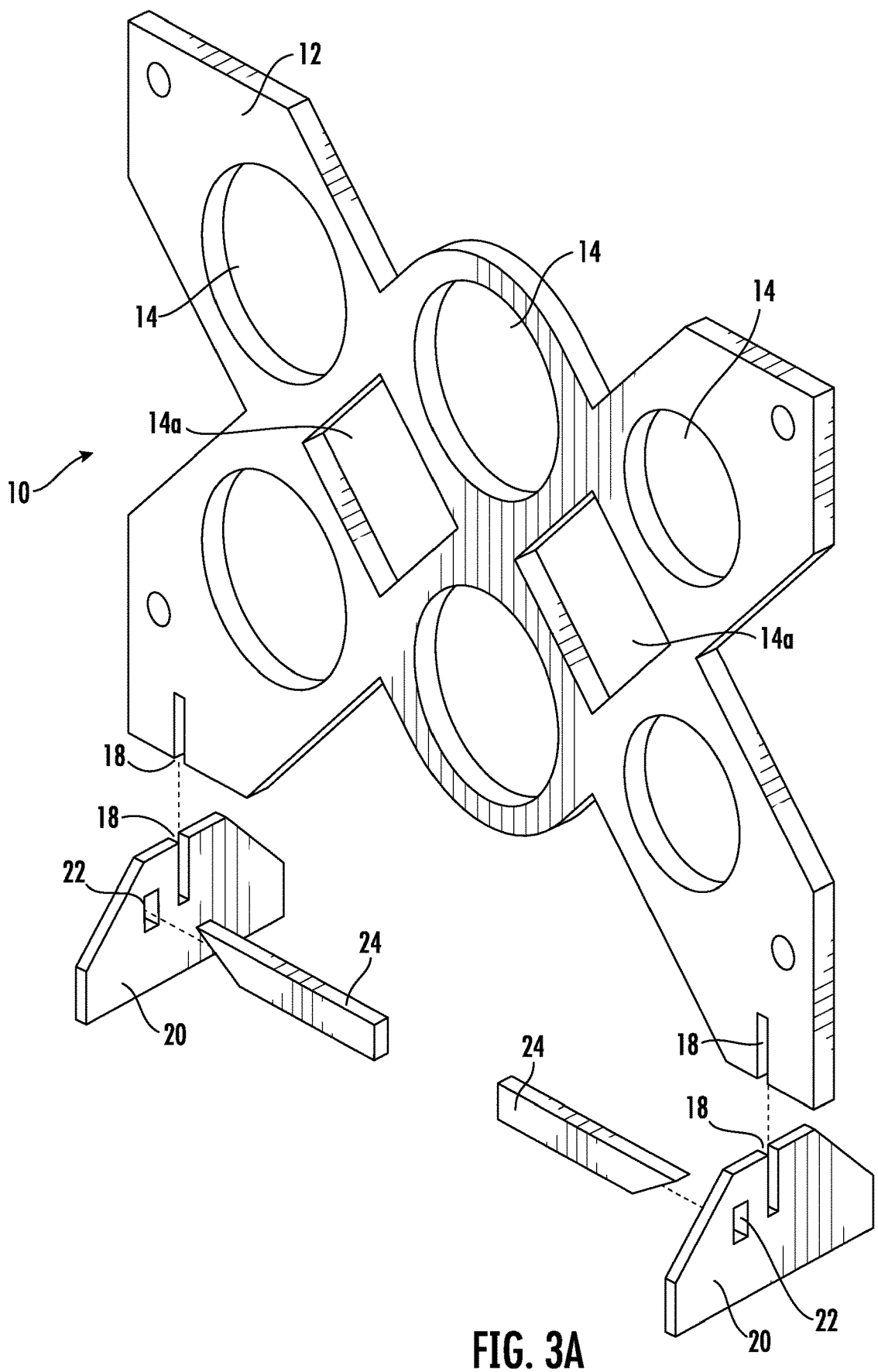
FIG. 3A is an exploded, perspective view of the embodiment of a modular conduit support assembly shown in FIG. 2A, illustrating the main body member in a generally vertical orientation, and further illustrating the feet in a generally vertical orientation in a perpendicular vertical plane with respect to the main body member so that the slots on the top edges of the feet are aligned with the slots on the bottom edge of the main body member, and wherein the stakes are positioned adjacent the slots or holes defined in each foot for insertion therethrough.
Figure 3B:
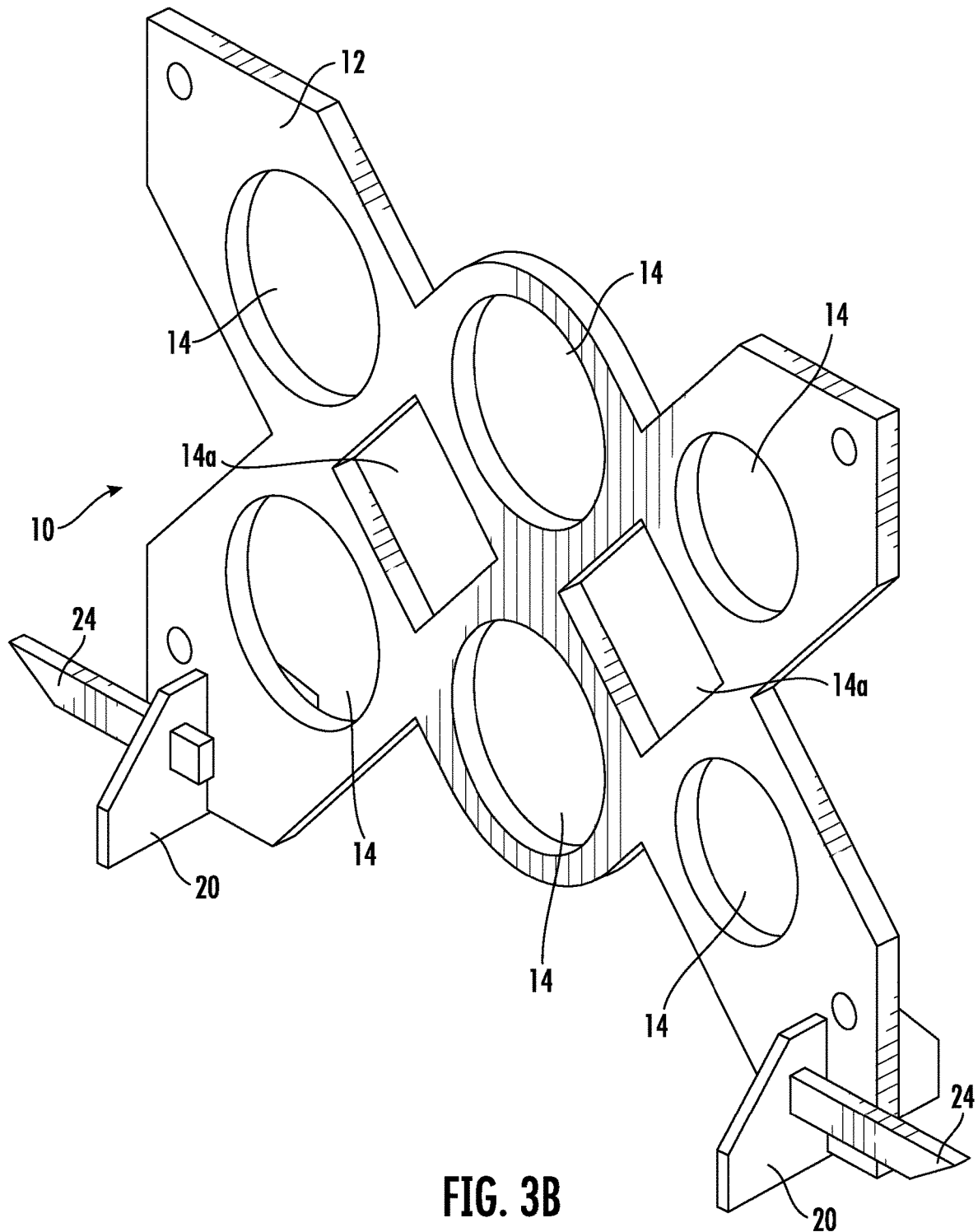
FIG. 3B is a perspective view of the embodiment of a modular conduit support assembly shown in FIG. 3A in a fully assembled state, showing the main body member in a generally vertical orientation, wherein the feet in a generally vertical orientation in a perpendicular vertical plane with respect to the main body member to provide support therefor, and wherein each stake extends through the hole or slot defined by a respective foot.
Figure 4:
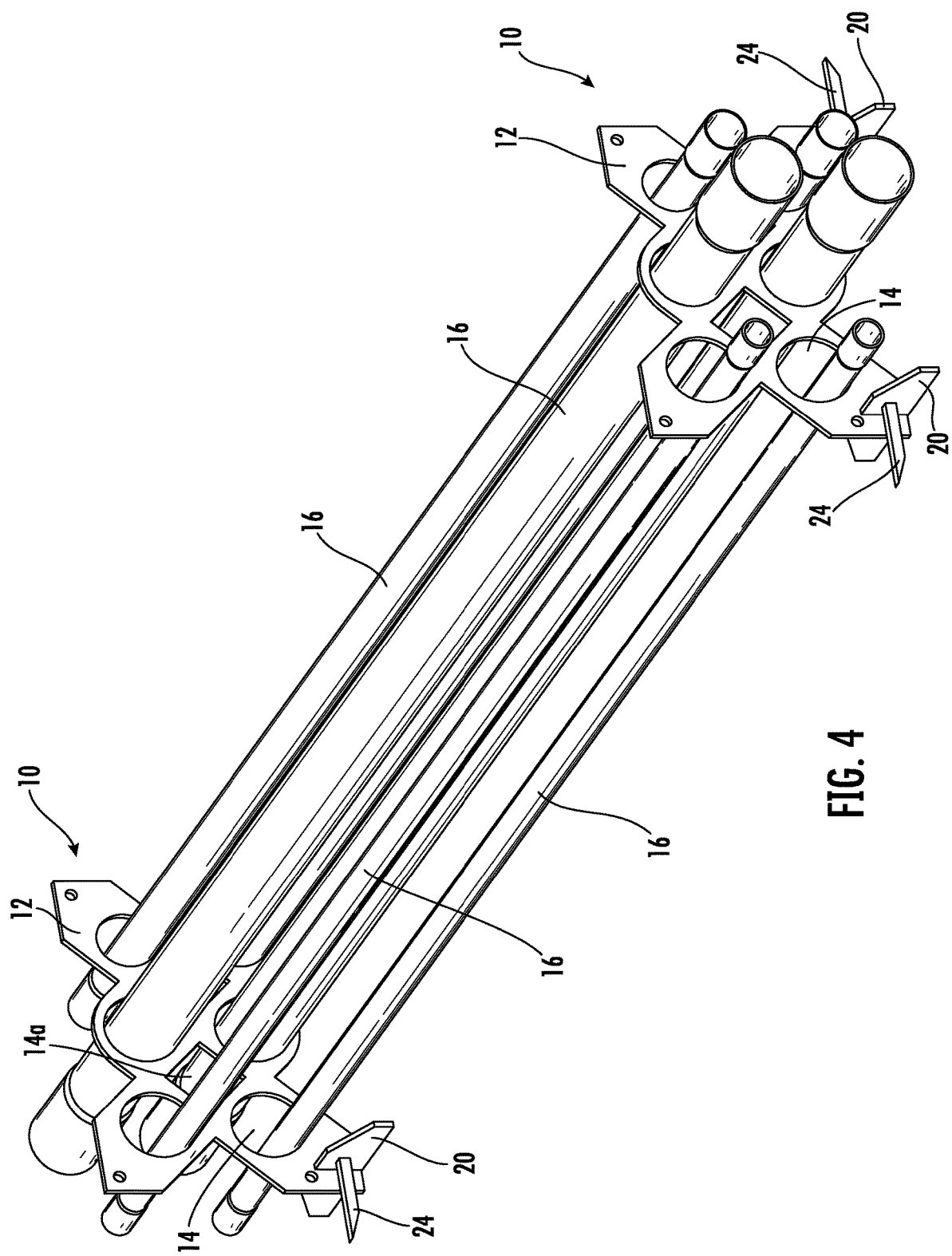
FIG. 4 is a perspective view showing one embodiment of modular conduit support assemblies in use supporting a plurality of conduits disposed in a parallel configuration, wherein the conduits extend through holes defined by the main body members of fully assembled modular conduits positioned adjacent either end thereof.

In use, a stack of the pre-cut modular assemblies 10 may be transported to a job site, where the excess material 28 of the hole interiors, the feet 20 and stakes 24 are then removed from each of the main body members 12. For each modular conduit support assembly 10, the feet 20 are attached to the bottom of the main body member 12 by aligning the vertical slot 18 along the top of each foot with one of the vertical slots 18 at the bottom of the main body member 12, as shown in FIGS. 3A and 3B. The feet 20 provide support for the main body member 12 to be positioned in a generally vertical orientation.

Figure 5:
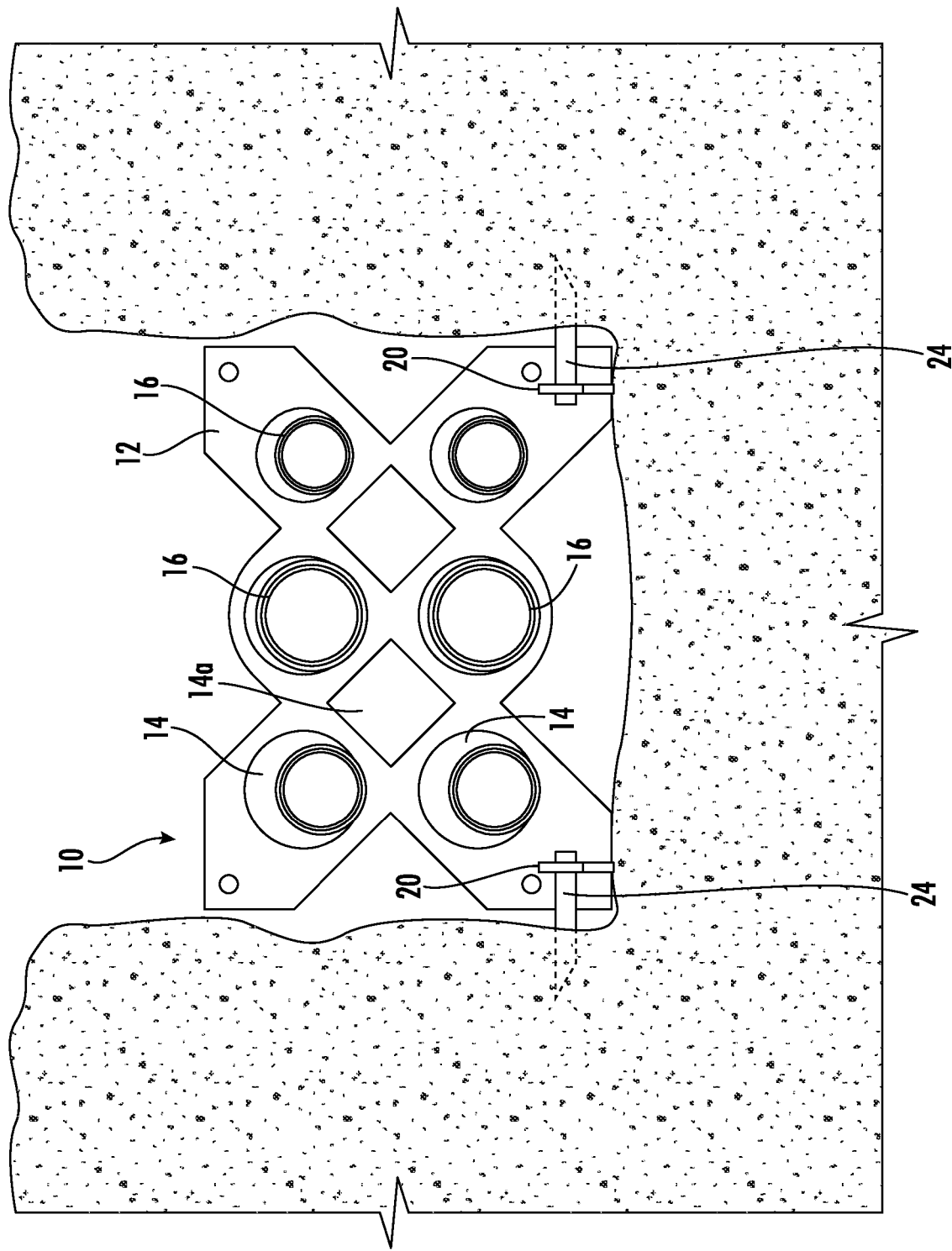
FIG. 5 is a cross-sectional front view of one embodiment of a modular conduit support assembly in use within a trench, wherein a fully assembled modular conduit support assembly supports a plurality of conduits extending through holes defined by the main body member, wherein the conduits disposed in a parallel configuration within a trench, and further illustrating stakes extending through holes or slots defined within the feet, wherein the stakes further extend into the ground walls of the trench to provide additional support therefor.

As shown in FIG. 5, the modular conduit support assemblies 10 are then placed into a trench, preferably at regular intervals, and conduit 16 is positioned so that it passes through the holes 14 defined by the main body member 12. It is preferred that a section of conduit 16 pass through corresponding holes 14 in successive conduit support assemblies 10, and it is understood that multiple conduits 16 may pass through and be supported by each conduit support assembly 10 in a generally parallel configuration, as shown.

In order to provide additional support, the stakes 24 may be driven through holes or slots 22 defined by the feet 20, so that the stakes 24 are driven into the sides of the trench, as shown in FIG. 5. This step helps to maintain the feet 20, as well as the main body member 12 and the conduit 16 passing therethrough, in a fixed position within the trench until the entire apparatus may be encased in concrete.

Once the modular conduit support assemblies 10 have been assembled so that the feet 20 are attached, the conduit 16 is in place and is being supported thereby, and the stakes 24 have been driven through the holes or slots 22 in the feet 20 and into the walls or sides of the trench, concrete is then poured into the trench and allowed to harden and dry. From that point, the conduit 16 and the modular conduit support assemblies 10 are fixed within the concrete.

It should be understood and noted that the modular conduit support assembly may be formed from any suitable material, but a polymeric material that maintains enough rigidity to support the conduit is preferred. The manufacturing process, including the steps of cutting the shape and holes of the main body member, as well as the partial cutting or scoring of the feet and stakes, may be performed in any other desired manner, such as stamping, laser cutting, high-velocity water cutting, or the like.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A modular conduit support assembly comprising:
a generally flat, rigid main body member formed from a single sheet of material, said main body member including a series of holes for receiving and supporting a plurality of conduits;
a pair of feet partially cut from said single sheet of material so that each said foot is attached to said main body member, and is detachable from said main body member; and
a pair of stakes partially cut from said single sheet of material so that each said stake is attached to said main body member, and is detachable from said main body member;
wherein said main body member, said pair of feet and said pair of stakes are configured into a single, flat, planar configuration.

2. The modular conduit support assembly set forth in claim 1, wherein said main body member defines a pair of slots along a bottom edge thereof.

3. The modular conduit support assembly set forth in claim 1, wherein each said foot defines a slot along an upper edge thereof.

4. The modular conduit support assembly set forth in claim 1, wherein each said foot defines a hole for receiving one of said stakes.

5. The modular conduit support assembly set forth in claim 1, wherein said single sheet of material is selected from the group consisting of polyvinyl chloride and high-density polyethylene.

6. A modular conduit support assembly comprising:
a generally flat, rigid main body member formed from a single sheet of material, said main body member including a series of partial cuts defining shapes selected from the group consisting of circles, ovals, squares and rectangles, wherein an interior portion of said sheet within said partial cuts are detachable to define holes for receiving and supporting a plurality of conduits;
a pair of feet partially cut from said single sheet of material so that each said foot is attached to said main body member, and is detachable from said main body member; and
a pair of stakes partially cut from said single sheet of material so that each said stake is attached to said main body member, and is detachable from said main body member;
wherein said main body member, said pair of feet and said pair of stakes are configured into a single, flat, planar configuration.

7. The modular conduit support assembly set forth in claim 6, wherein said main body member defines a pair of slots along a bottom edge thereof.

8. The modular conduit support assembly set forth in claim 6, wherein each said foot defines a slot along an upper edge thereof.

9. The modular conduit support assembly set forth in claim 6, wherein each said foot defines a hole for receiving one of said stakes.

10. A method of manufacturing a modular conduit support assembly comprising the steps of:

providing a sheet of material;

partially cutting said sheet of material into a main body member, a first foot, a second foot, a first stake and a second stake, so that said main body member, said first foot, said second foot, said first stake and said second stake are detachable from a remaining portion of said sheet of material;

partially cutting said main body member to form enclosed shapes, wherein said material disposed within said enclosed shapes is detachable from said main body member to form holes therein;

wherein said main body member, said first foot, said second foot, said first stake and said second stake are all detachably connected to one another in a generally flat, planar configuration.

11. The method set forth in claim 10, further including the step of stacking a plurality of said modular conduit support assemblies and securing said stack together for storage and transport.

12. The method set forth in claim 10, further including the step of detaching said first foot, said second foot, said first stake and said second stake from said main body member.

13. The method set forth in claim 10, further including the step of removing said enclosed shapes from said main body member.

14. The method set forth in claim 10, wherein said sheet of material is selected from the group consisting of polyvinyl chloride and high-density polyethylene.

* * * * *